United States Patent
Corella et al.

(10) Patent No.: US 9,441,922 B2
(45) Date of Patent: Sep. 13, 2016

(54) METHOD AND APPARATUS FOR IMPROVING GIMBAL STABILITY

(71) Applicant: BAE Systems Information and Electronic Systems Integration Inc., Nashua, NH (US)

(72) Inventors: Armando Corella, Azusa, CA (US); Charles T. Knorr, Akron, OH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 307 days.

(21) Appl. No.: 14/244,463

(22) Filed: Apr. 3, 2014

(65) Prior Publication Data

US 2015/0061565 A1    Mar. 5, 2015

Related U.S. Application Data

(63) Continuation of application No. 12/460,014, filed on Jul. 9, 2009, now abandoned.

(60) Provisional application No. 61/134,464, filed on Jul. 9, 2008.

(51) Int. Cl.
| | |
|---|---|
| *H04K 3/00* | (2006.01) |
| *G01S 7/495* | (2006.01) |
| *F41H 13/00* | (2006.01) |
| *F41G 7/22* | (2006.01) |

(Continued)

(52) U.S. Cl.
CPC ........... *F41H 13/0056* (2013.01); *F41G 7/224* (2013.01); *F41H 13/0062* (2013.01); *G01S 7/495* (2013.01); *G05B 19/042* (2013.01); *G05B 2219/41116* (2013.01)

(58) Field of Classification Search
CPC ............. F41H 13/0043; F41H 13/005; F41H 13/0056; F41H 13/0062; G05B 19/02; G05B 19/04; G05B 19/042; G05B 2219/30; G05B 2219/41; G05B 2219/41116; F41G 5/08; F41G 7/20; F41G 7/22; F41G 7/224; G01S 7/48; G01S 7/495
See application file for complete search history.

(56) References Cited

U.S. PATENT DOCUMENTS 6,587,486 B1 *  7/2003  Sepp ................... F41H 13/0062
                                                    372/20
7,136,726 B2   11/2006  Greenfeld et al.
(Continued)

OTHER PUBLICATIONS

D.H. Titterton et al., "Strapdown Inertial Navigation Technology", second edition, Chapter 15, appendices A through D, Glossary and Index; pp. 441-558; American Institute of Aeronautics and Astronautics, Inc.; Reston, Virginia, USA; copyright 2004.

(Continued)

*Primary Examiner* — Bernarr Gregory
(74) *Attorney, Agent, or Firm* — Daniel J. Long; Scott J. Asmus

(57) ABSTRACT

Enhanced stability for infrared countermeasure systems is provided by using a pair of single axis rate sensors having orthogonal active axes, preferably aligned with the elevation axis and the azimuth axis of the gimbal. The outputs of the orthogonal single axis rate sensors are used to detect instantaneous aircraft angular movement and to use the detected movement to drive the elevation and azimuth motors of the gimbal to move the output mirror for the gimbal to cancel the detected movement.

20 Claims, 7 Drawing Sheets

(51) Int. Cl.
*G01S 7/00* (2006.01)
*G05B 19/042* (2006.01)

(56) References Cited

U.S. PATENT DOCUMENTS

| | | | | |
|---|---|---|---|---|
| 7,292,319 B1 * | 11/2007 | Carter | ............ | F41G 7/224 356/139.08 |
| 7,308,342 B2 | 12/2007 | Greenfeld et al. | | |
| 7,378,626 B2 * | 5/2008 | Fetterly | ............ | F41G 7/224 244/1 R |
| 7,569,824 B2 * | 8/2009 | Gidseg | ............ | F41G 7/224 250/347 |
| 7,636,452 B2 * | 12/2009 | Kamon | ............ | F41G 5/08 235/411 |
| 7,667,190 B2 * | 2/2010 | Mills | ............ | F41G 7/224 244/3.16 |
| 7,688,247 B2 * | 3/2010 | Anschel | ............ | F41H 13/0056 244/3.1 |
| 7,733,465 B2 * | 6/2010 | Gidseg | ............ | F41G 7/224 356/28 |
| 7,830,499 B1 * | 11/2010 | Corella | ............ | G01S 7/495 356/28 |
| 7,920,255 B2 * | 4/2011 | Aphek | ............ | F41G 7/224 356/193.04 |
| 8,527,115 B2 | 9/2013 | Greenfeld et al. | | |

OTHER PUBLICATIONS

A. Corella, Gimbal Stability Investigation, BAE Systems IRCM Pomona EOS, Jun. 14, 2002.
Product Literature relating to QRS11. Copyright 1998.

* cited by examiner

METHOD AND APPARATUS FOR IMPROVING GIMBAL STABILITY

RELATED APPLICATIONS

This application is a continuation of U.S. application Ser. No. 12/460,014 filed Jul. 9, 2009 now abandoned, and claims rights under 35 USC §119(e) from U.S. Application Ser. No. 61/134,464 filed Jul. 9, 2008, the contents of which are incorporated herein by reference.

FIELD OF THE INVENTION

This invention relates to directed infrared countermeasure, DIRCM, systems for the protection of aircraft from infrared seeking guided missiles and more particularly to a method and apparatus for improving gimbal stability utilizing single axis rate sensors.

BACKGROUND OF THE INVENTION

When utilizing directed infrared countermeasure (DIRCM) systems, the systems employ a gimbal pointing system which is used in the tracking and lazing of a target once it has been detected. The gimbal tracking is provided by a DIRCM gimbal head that has pointing mirrors and an embedded IR camera. The camera has a frame rate and integrates the collected data during which the camera is temporarily shut-off. During this period the gimbal pointing system aim-point is prone to any direct or induced gimbal movement. One of the largest angular movements occurs when the aircraft rolls, pitches or yaws, oftentimes up to 400 degrees per second. Because the DIRCM head is mounted external to the aircraft, the aim-point can be severely impacted during camera integration time. The other major contributor to angular movement is induced aircraft vibration. Thus during integration time the aim-point is susceptible to movement if no compensation system is employed. The problem therefore becomes how to counteract the motion of the aircraft when utilizing a directed countermeasure system to illuminate a target.

In a "strapped down" approach to provide stability in a gimbal pointing system, the gimbal motion is sensed at its base by a gyroscope, and drives are provided to cancel out the sensed angular motion. However, these systems utilize complicated algorithms to sense gimbal platform motion.

In particular, if one were to mount a gyro stabilization unit at the base of a DIRCM gimbal head, the distance between the sense mechanism and the optical elements in the gimbal head present problems resulting in aim-point errors. To eliminate the interpolation and complicated algorithms used in gimbal stabilization, designers moved the gyro closer to the input mirror carried by the DIRCM head. However the sheer weight of a gyro when strapped-on to the optical members of the gimbal generates noise due to the flywheels themselves, thus limiting the success of the stabilization process.

Note that there are stringent pointing accuracy requirements for the gimbal systems used for IR countermeasures which necessitates the use of a high gain tracking loop. The requisite aiming accuracy is on the order of 200 microradians which in itself is difficult to achieve. Add to this aircraft motion and the task of providing 200 microradian accuracies is challenging. Attempts have been made to provide stabilization using two axis gyroscopes. However, it was discovered that two axis gyroscopes could not support the high gain track loops. Simply put, the cross coupling inherent in the gyroscope nutation dynamics does not allow the nutation mode to be satisfactorily stabilized.

To realize the required performance, tracking loops require gains on the order of 8,000 $\sec^{-2}$. Laboratory experiments have indicated the onset of nutation mode instability at gains exceeding 400 $\sec^{-2}$; and with control loop redesign one can only achieve stable operations with gains below 1,000 $\sec^{-2}$. Since the aim-point error accuracies of 200 microradians require track loops gains on the order of 8,000 $\sec^{-2}$, something other than gyro stabilized platforms is required.

It is therefore necessary to provide better stability, particularly for two axis gimbal pointing systems, so that infrared laser radiation from an infrared laser mounted to the gimbal actually intercepts and impinges on the target.

More particularly, the gimbaling platform for a DIRCM system is subjected to vibration and accelerations due to aircraft movement, and importantly during the course of a camera frame. In target acquisition involving the detection of the target on a focal plane array carried by the camera, the camera is turned on and off at a predetermined frame rate. During the off time a considerable amount of aircraft movement can occur which moves the gimbal aim-point.

In the past, stabilization systems have locked down the tracking system when the camera is off, and this is accomplished by inhibiting stabilization signals. During lockdown the gimbal pointing system continues to point the laser beam at the last computed point. If the aircraft pitches, rolls or yaws when the camera is on, pointing stabilization corrections are applied. However, when the camera is off the system tracks normally, but without stabilization. There is therefore a need to provide stabilization when the camera is off.

As mentioned above, some systems put the stabilization gyro at the base of the gimbal to monitor the movement at the gimbal pointing system base. This however is ineffectual because the translation or interpolation problem in referencing the movement at the gimbal base to where the gimbal pointing mirrors are located. Thus, the gyro-stabilized gimbaling systems monitor motion at some distance from the pointing mirrors. Due to the distance between the sensing platform and the mirrors, the error could be a substantial half laser beam width, or as much as 500 microradians. Given the 200 microradian requirement, gyro stabilization translation errors preclude the use of gyros. Moreover, if it were possible to place the gyro at the mirror location, thus eliminating the problem of interpolation, noise caused by the nutating masses of the gyroscope is nonetheless injected into the system.

SUMMARY OF INVENTION

Rather than using gyro stabilization, in the subject invention a pair of single axis rate sensors is placed at the gimbal pointing mirrors to sense induced angular movement directly at the mirrors. As such the subject system eliminates the translation problems associated with "strap-down" gyro stabilized systems as well as the gyro-induced noise that is directly coupled into the mirrors. These single axis rate sensors have orthogonally oriented rate sensing axes for sensing the angular velocity of unwanted induced motion, with the sensing done directly at the gimbal pointing system mirrors. Note that these rate sensors are very small and lightweight and involve piezoelectric devices, as opposed to rotating gyro discs. Also, the use of rate sensors eliminates the noise introduced by the motor driven elements of a gyroscope.

A single axis rate sensor typically uses a stimulated tuning fork that changes frequency upon acceleration. The sensor frequency is converted to a voltage directly related to angular movement. This analog voltage is converted to its digital counterpart, and using an algorithm drive signals are generated which are applied to the elevation and azimuth drive motors to move the pointing mirrors to cancel out the detected angular motion. One can therefore monitor the frequency output of the rate sensor to ascertain angular motion of the aircraft and then drive the elevation and azimuth stages of the gimbal to move the mirrors by an amount that directly counters this sensed angular motion.

It will be appreciated that with respect to gyroscopes, they are of a weight that would not make them mountable directly at an optical element. This can be seen from the Kenyan Gyro stabilizers, of which the lightest KS-2 weighs 1.5 pounds. These gyroscopic units are exceedingly heavy and cannot easily be supported by optical elements in a DIRCM head. Moreover, it is virtually impossible to provide balancing when providing gyroscopes at the extremities of a two axis gimbaling system.

On the other hand, the single axis rate sensors that are utilized in the subject invention are exceedingly small and are fabricatable using MEMS technology so that they may be mounted directly at the gimbal mirrors.

Moreover, it will be appreciated that in conventional camera stabilization systems, stabilization is done electronically to remove jitter. However in DIRCM systems the aircraft motion results in orders of magnitude greater aiming errors than does jitter. In order to point the laser carried by a gimbal pointing system head, the subject mechanical stabilization system removes unwanted induced motion in which the mirrors that aim the laser beam are moved to an angle that cancels the angular movement due to aircraft motion. Thus, it is not a matter of electronically removing jitter as in the case of stabilized video cameras, but rather moving the pointing mirrors of the gimbal pointing system in such a way that the new mirror position cancels the angular error due to mirror or aircraft motion.

In summary, enhanced stability for infrared countermeasure systems is provided by using a pair of single axis rate sensors having orthogonal active axes, preferably aligned with the elevation axis and the azimuth axis of the gimbal. The outputs of the orthogonal single axis rate sensors are used to detect aircraft angular motion and to use the detected angle to drive the elevation and azimuth motors in the gimbal pointing system to move the pointing mirror or mirrors to the opposite angular direction.

The subject solution de-couples the track loops associated with gyro stabilization by replacement of a gyroscope with two single axis angular rate sensors. One rate sensor is placed on the elevation arm that rotates the output mirror of the gimbal pointing system about the elevation axis and has its sensitive axis aligned with the elevation axis. The other rate sensor is conveniently mounted below the input or camera collection mirror with its sensitive axis parallel to the azimuth axis.

The subject system not only employs simple solid state rate sensors that are more robust than gyroscopes, it also completely eliminates the tonal noise that occurs at the nutation frequency, at the motor spin frequency and at multiples thereof. Also, tonal noise that is the product of frequency dependence on the spin bearing retainer design is also eliminated. Moreover, the use of two separate rate sensors allows the sensors to be physically separated to achieve a more advantageous mass distribution of the elevation gimbal assembly.

BRIEF DESCRIPTION OF THE DRAWINGS

These and other features of the subject invention will be better understood in connection with the Detailed Description, in conjunction with the Drawings, of which.

DETAILED DESCRIPTION

Figure 1:
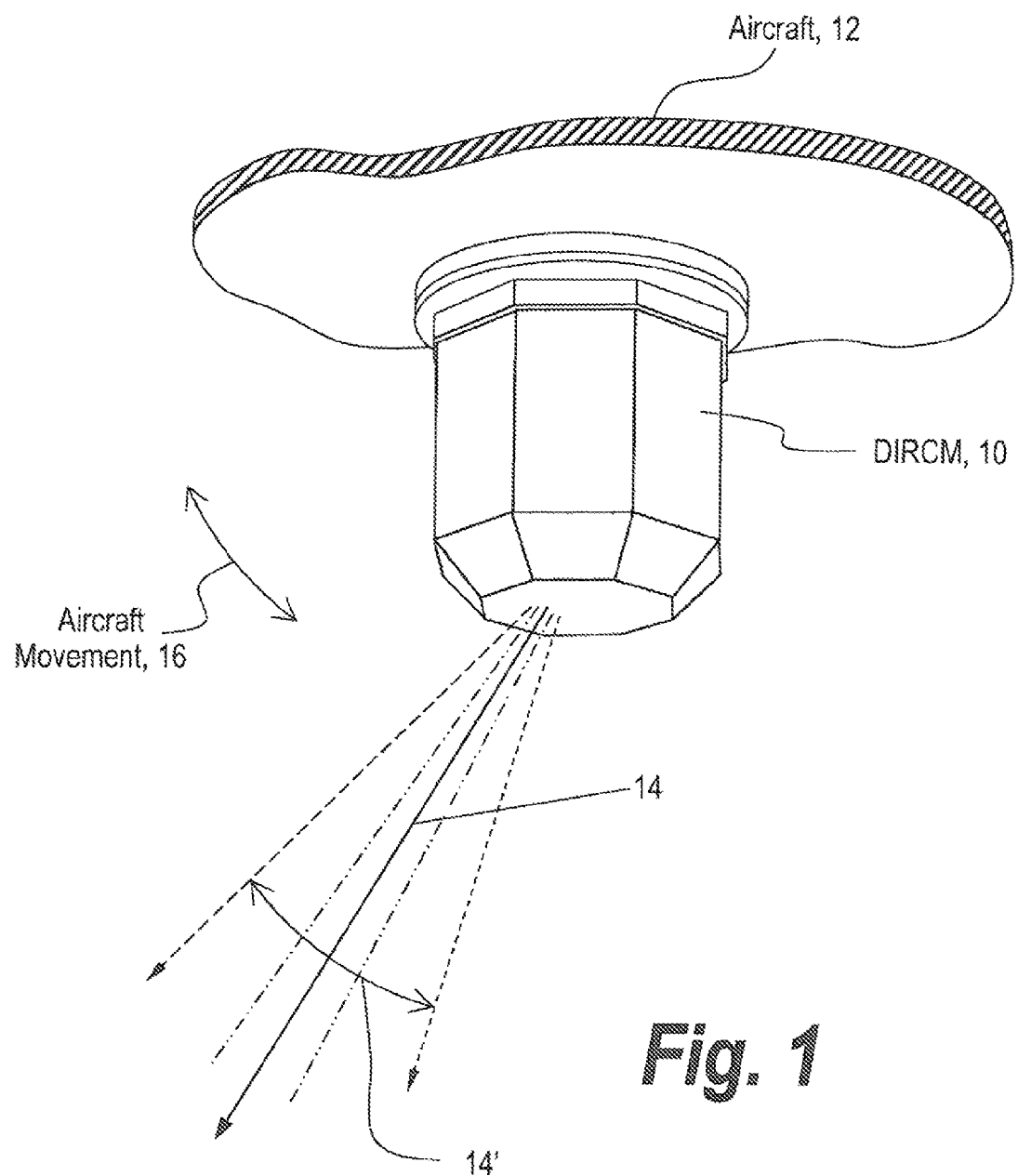
FIG. 1 is a diagrammatic illustration of the problem of pointing accuracy when using a directed infrared countermeasure system which must be compensated for aircraft movement in the pitch, roll and yaw directions.

Referring now to FIG. 1, a DIRCM or directed infrared countermeasure gimbal 10 is mounted to an aircraft fuselage 12 from which laser beams 14 emanate in the directions indicated.

It will be appreciated that if the aircraft yaws, rolls or pitches during the time that the gimbal-carried internal camera in the directed infrared countermeasure system is off during an integration interval then the pointing direction will exhibit significant aiming point errors depending on aircraft movement 16 as illustrated by beam divergence 14'.

While aim-point errors may be eliminated by gyro stabilization of gimbal 10, as mentioned above, these types of systems have significant disadvantages.

Figure 2:
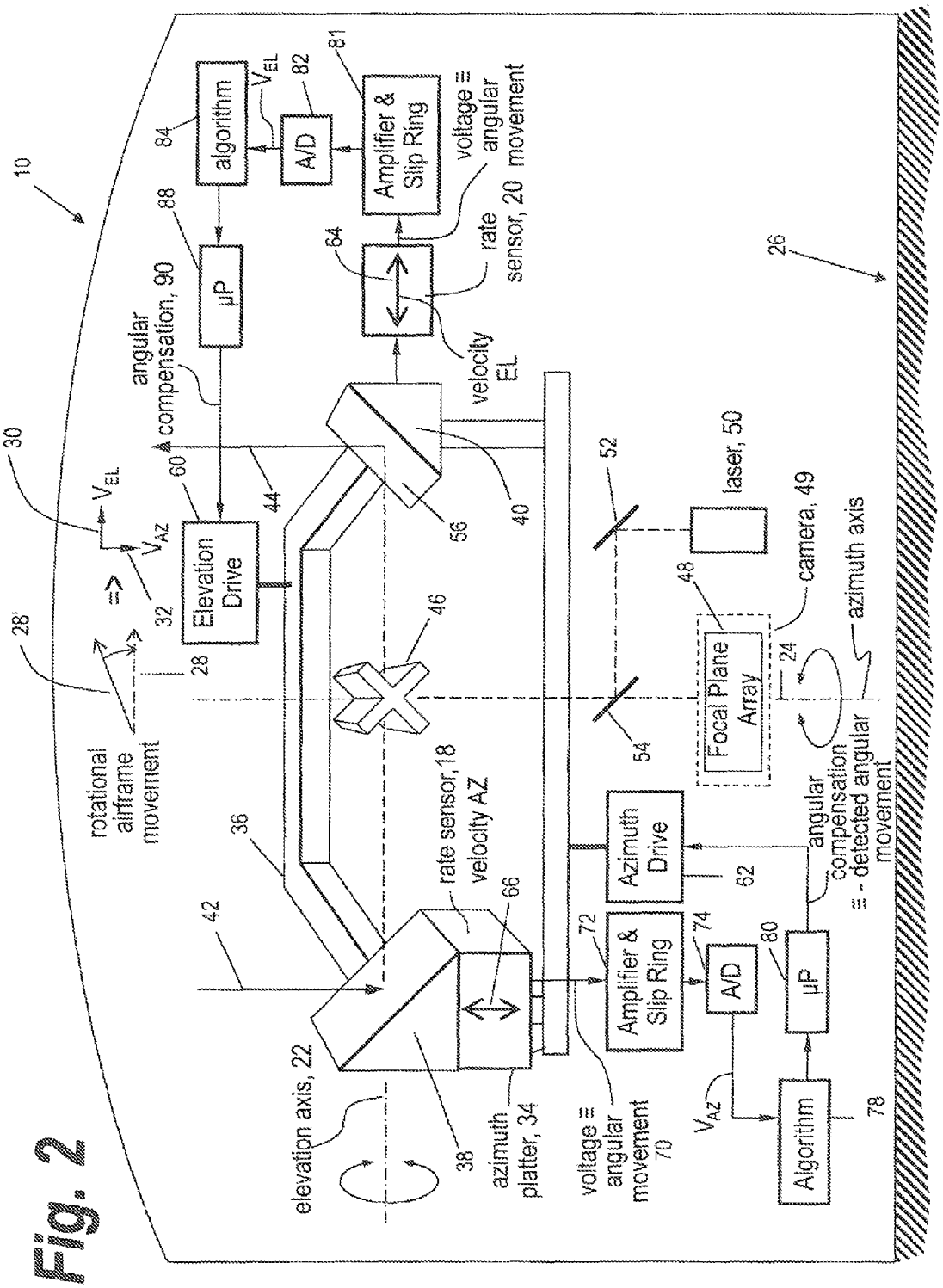
FIG. 2 is a diagrammatic illustration of the subject system in which orthogonal single rate sensors respectively aligned with the elevation and azimuth axes are used to develop voltages proportional to velocity projected along these axes and to apply these voltage outputs to a processor that outputs an angular compensation signal to respective azimuth and elevation drives to drive these units by an angle that is the negative of the detected angular motion, thereby to cancel the effects of aircraft motion.

Referring now to FIG. 2, what is shown for gimbal 10 is the utilization of single orthogonal rate sensors 18 and 20 aligned respectively along an elevation axis 22 and parallel to an azimuth axis 24 to be able to sense gimbal platform 26 movement in two orthogonal directions; and specifically the movement of the gimbal 10. As illustrated by arrows 28 and 28', air frame movement from a rotational point of view involves velocities which are projectable along the elevation and azimuth axes as illustrated respectively by velocity vector 30 for the elevation, and velocity vector 32 for the azimuth.

Here it can be seen that an azimuth platter or table 34 is rotated about the azimuth axis, whereas a uni-construction elevation arm 36 rotatable about the elevation axis carries an input mirror 38 and an output mirror 40, with the elevation arm mounted to the azimuth platter or table 34 such that with proper alignment of the mirrors the line-of-sight 42 to a target and the projected laser beam 44 from the gimbal 10 are parallel.

Also shown are the internal mirrors 46 one of which redirect the incoming light beam to a focal plane array 48 which is part of the narrow angle camera 49 for the gimbal 10. The laser beam emitted from a laser 50 is redirected by mirrors 52 and 54 and the other of the internal mirrors 46 to the reflective surface 56 of output mirror 40.

As illustrated, the uni-construction elevation arm 36 is driven by an elevation drive 60 to rotate the elevation arm about the elevation axis, whereas the elevation arm with its mirrors is rotated around the azimuth axis through the utilization of azimuth drive 62.

Note that the sensitive axis of rate sensor 20 is shown by double-ended arrow 64, whereas the sensitive axis of rate sensor 18 is shown by double-ended arrow 66, with these single rate sensor axes being orthogonal, one to the other.

It is the purpose of the single axis rate sensors to be able to sense aircraft platform 26 motion, and more particularly velocity, in the above orthogonal directions. Note, platform 26 is fixed to the air frame.

Thus, the motion that is sensed is sensed directly at input mirror 38, output mirror 40 and internal mirrors 46.

As will be seen, rate sensor 18 has an output 70 which is coupled to an amplifier and slip ring assembly 72, with the output of the rate sensor being a voltage that is a direct measurement of the angular velocity of the platform. This voltage is converted by an analog-to-digital converter 74 and is applied as a digital number as an input to a processor 78 that through an algorithm outputs the angle corresponding to the motion of the platform along the azimuth direction.

The rate sensor's function is now described. The drive portion of the rate sensor looks and acts exactly like a simple tuning fork. Because the drive tines are constructed of crystalline quartz, it is possible to electronically "ring" this tuning fork. Each fork tine has a mass and an instantaneous radial velocity which changes sinusoidally as the tine moves back and forth. As long as the fork's base is stationary the momenta of the two tines exactly cancel one another and there is no energy transfer from the tines to the base.

As soon as the tuning fork is rotated around its axis of symmetry, the Coriolis principle exerts a profound influence on the behavior of this mechanism. By convention the rotational vector, $\omega_i$, is described by an arrow that is aligned with the axis of rotation. The instantaneous radial velocity of each of the tines will, through the Coriolis effect, generate a vector crossproduct with this rotation vector.

The net effect is that each tine will generate a force perpendicular to the instantaneous radial velocity of each of the tines:

$$F=2m\omega_i *V_r \qquad (1)$$

where:
  m=tine mass
  $\omega_i$=rotation rate
  $V_r$=radial velocity

Note that this force is directly proportional to the rotation rate, and since the radial velocity of the tines is sinusoidal, the force on each tine is also sinusoidal. Because the radial velocities of the two tines are equal and opposite, the Coriolis forces are equal and opposite, producing an oscillating torque at the base of the drive tine fork which is proportional to the input angular rate.

The sinusoidal torque variation causes the pickup tines to begin moving tangentially to the rotation and at the same frequency as the drive vibration. Since the forces causing the pickup tines to move are directly proportional to the rotation rate, if there is no rotation the pickup tines will not move.

Once the pickup tines are in motion, it is a simple matter to amplify the pickup signal and then demodulate it into a DC voltage using the drive frequency as a reference. One additional stage of amplification allows for some signal shaping that smoothes the DC signal output which is directly proportional to the input angular rate. These functions are all embedded in the rate sensor.

In the control loop a DC offset is added to allow an operator to rotate and point camera 49 in gimbal 10 so that there is never a zero value.

The largest induced rate changes of an aircraft's roll, pitch, and/or yaw affects the pointing accuracy of gimbal 10. The rate sensor takes advantage of Coriolis affects and nulls outs the angular movement by dampening the movement from the output of the rate sensor.

Note that analog-to-digital converter 74 converts the analog voltage to a corresponding digital number and processor 78 differentiates the angular velocity information and turns it into an instantaneous angular position.

The angular position generated by processor 78 is coupled to a microprocessor 80 which outputs an angular compensation signal which is the negative of the induced movement. This negative of the induced movement is applied to azimuth drive 62 to drive mirror 40 face 56 to an angle which counteracts or cancels the azimuth angular component of error associated with platform movement. Note also, microprocessor 80 includes back EMF, bearing friction, mechanical spring action and the basic motor characteristics before determining the appropriate drive current to be applied to azimuth drive 62.

Likewise for the elevation axis, the voltage output of the single axis rate sensor 64 is applied to amplifier and split ring assembly 81 in terms of a voltage proportional to the angular velocity sensed, which voltage is converted by analog-to-digital converter 82 to a corresponding digital number that is applied to a processor 84, that through the appropriate algorithm outputs to microprocessor 88 the negative of induced movement. This negative of the induced movement is applied as angular compensation 90 to elevation drive 60 to drive mirror 40 face 56 to an angle which counteracts or cancels the elevation angular component of error associated with platform movement.

In this manner the angular velocity of platform 26 sensed by the orthogonal single axis rate sensors 18 and 20 and is used to derive a signal which corresponds to the negative of the angle that is associated with the aircraft movement, and in one embodiment applies this correctional signal to the azimuth and elevation drives when gimbal camera 49 is off.

Figure 3:
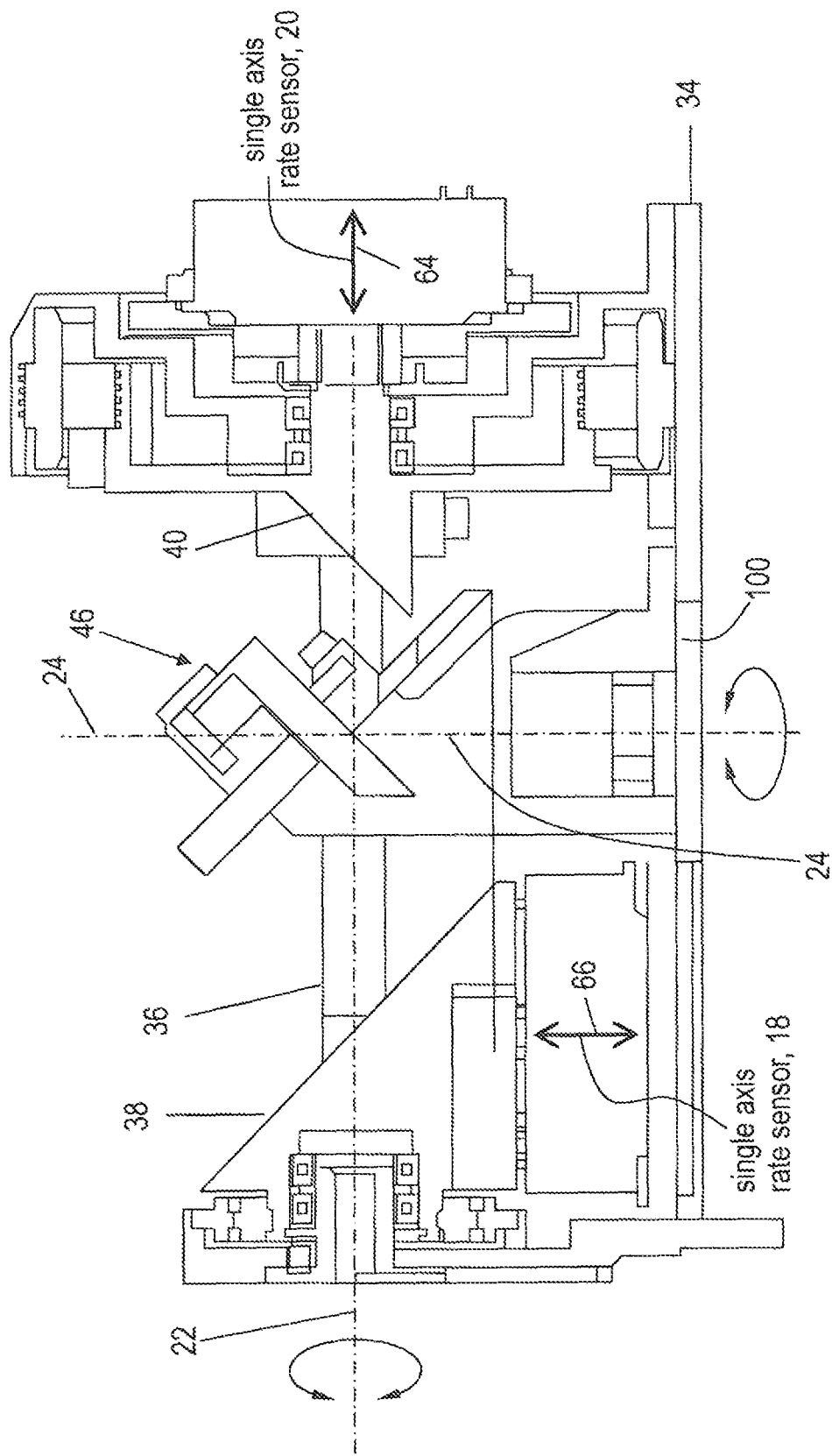
FIG. 3 is a diagrammatic illustration of one embodiment of the subject invention in which on-axis rate sensors are utilized with a uni-construction elevation arm that carries the input or collecting mirror and the output mirror for the subject gimbal pointing system as well as internal mirrors used to redirect incoming images to a focal plane array and to direct laser outputs to the output mirror of the system.

Referring to FIG. 3, what can be seen is that azimuth platter or table 34 is provided with an aperture 100 through which the incoming image is transmitted to the focal plane array of the camera (not shown in this figure) which is redirected from input mirror 38 by internal mirrors 46 along azimuth axis 24.

It is noted that uni-construction elevation arm 36 carries input mirror 38 and output mirror 40 as illustrated.

What will also be seen is that one single axis rate sensor, here rate sensor 20, is carried by elevation arm 36 such that its sensitive axis 64 is aligned with elevation axis 22. Likewise, single axis rate sensor 18 is conveniently mounted to input mirror 38 assembly such that its sensitive axis 66 is parallel to the azimuth platter axis 24.

Alternatively, if it were possible to fit the single axis rate sensors on the platter itself, these sensors would nonetheless sense the aircraft movement at input mirror 38, output mirror 40 and internal mirrors 46.

In this manner there is no significant offset of the sensing of aircraft movement with respect to the gimbal mirrors that provide the aim-point accuracies described above.

Figure 4:
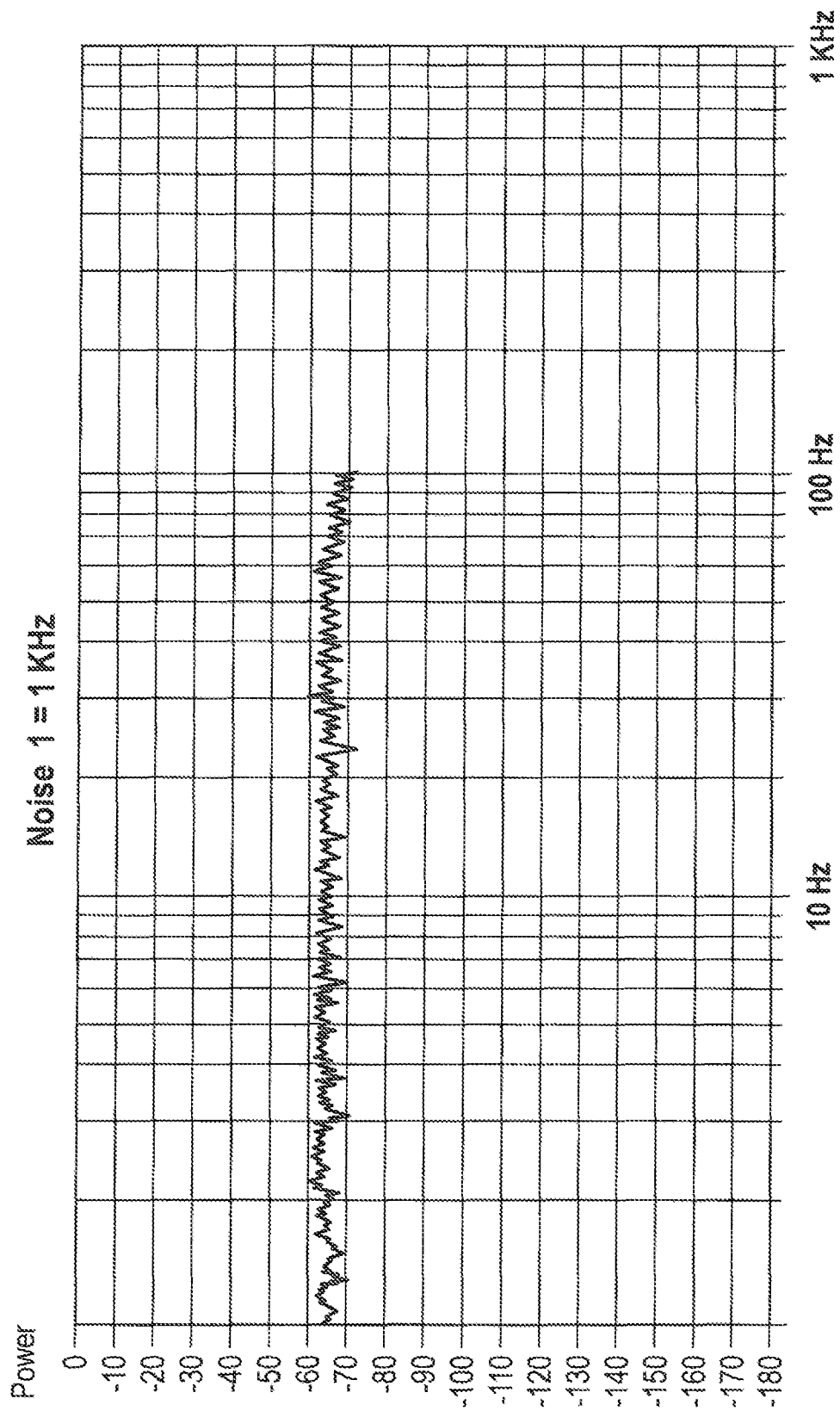
FIG. 4 is a graph of the one kilohertz noise measurements at the output of the single rate sensor.

Three points were measured during a test of the subject system. Outputs were measured at the single axis rate sensor. Measurements were taken after the 4× amplifiers used. Finally outputs were measured after the slip ring. The following is a brief description of each of the tests:

Referring to FIG. 4, rate sensor output static noise was measured as follows:
Scale factor: 0.05 V/deg/sec $$\text{Measured from 1-100 Hz} = -42.2 \text{ dbVrms} = 7.76 \text{ mV}$$
$$= 0.155 \text{ deg/sec}$$
$$= 0.0155 \text{ deg/sec/Hz}^2$$

Figure 5:
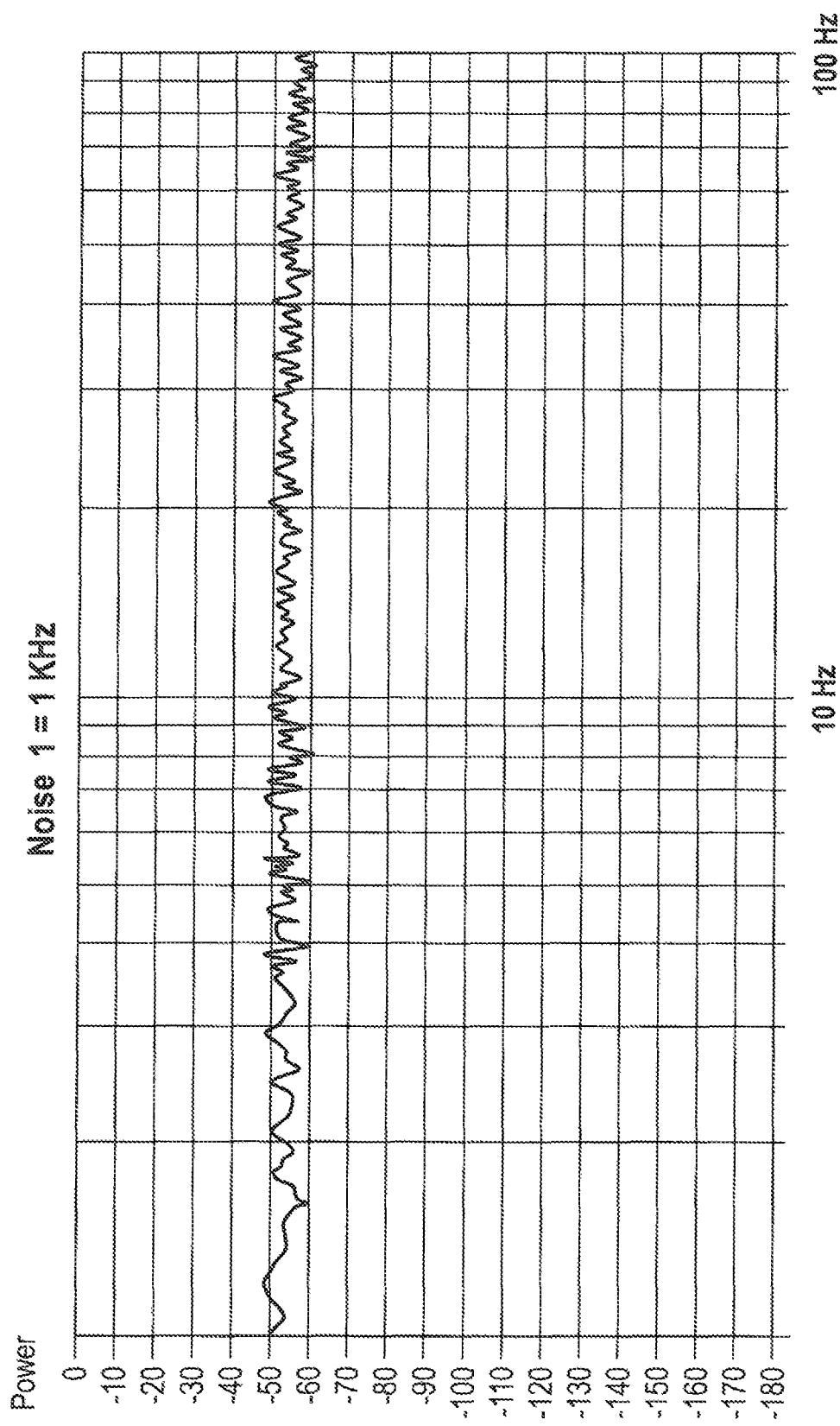
FIG. 5 is a graph showing the noise measurements after post-amplification.

Referring to FIG. 5, rate sensor output static noise post amplifier was measured as follows:
Scale factor: 0.05 V/deg/sec $$\text{Measured from 1-100 Hz} = -30.2 \text{ dbVrms} = 31 \text{ mV}$$
$$= 0.15 \text{ deg/sec}$$
$$= 0.015 \text{ deg/sec/Hz}^2$$

Figure 6:
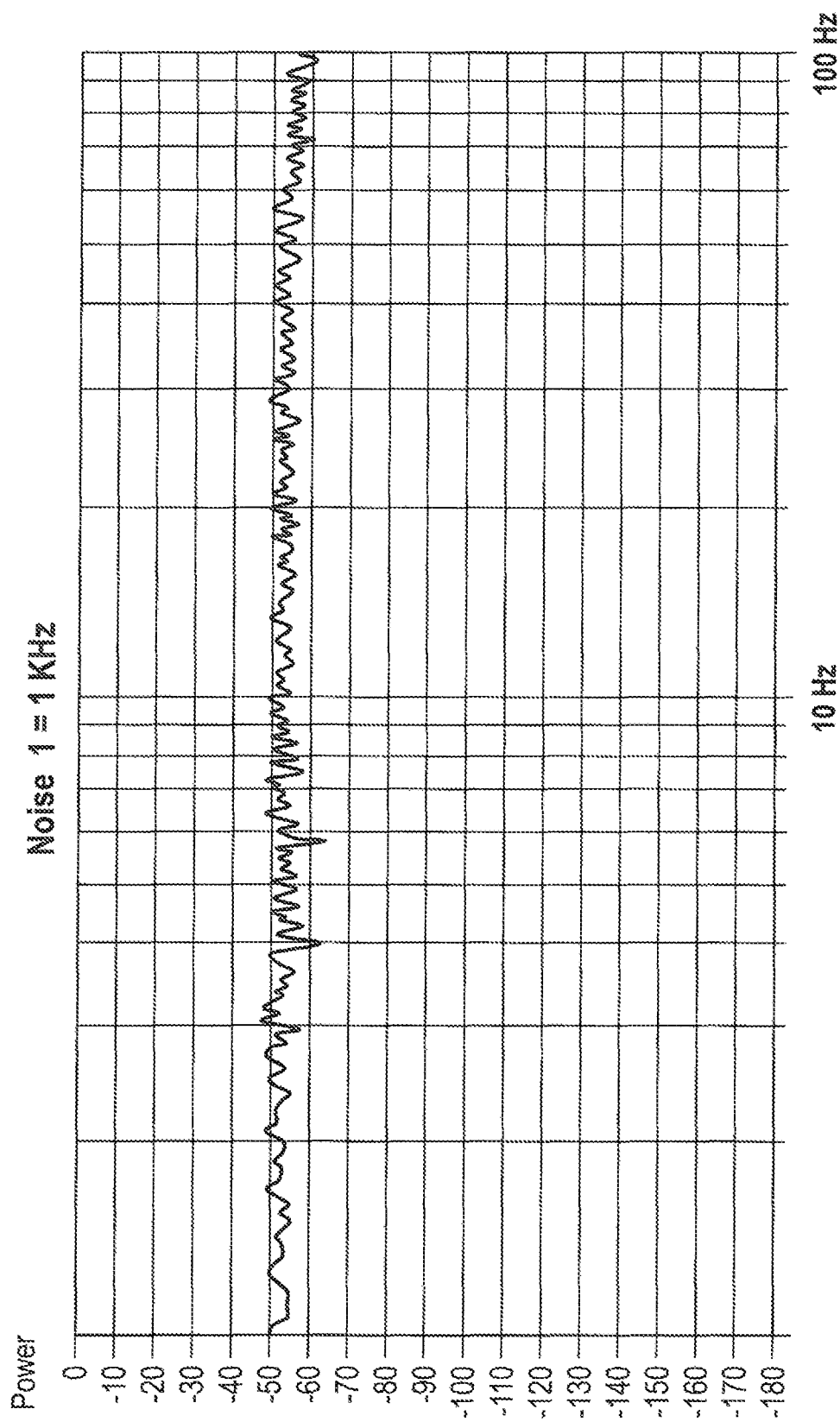
FIG. 6 is a graph of the noise measurements post slip ring.

Referring to FIG. 6, Rate sensor output static noise post amplifier was measured as follows:
Scale factor: 0.2 V/deg/sec $$\text{Measured from 1-100 Hz} = -29.9 \text{ dbVrms} = 32 \text{ mV}$$
$$= 0.16 \text{ deg/sec}$$
$$= 0.016 \text{ deg/sec/Hz}^2$$

The following is a summary of the test results: The single axis rate sensor has an advertised static noise value of ≤0.010 deg/sec/Hz$^2$ from DC to 100 Hz. The testing indicated the output noise measured approximately 50% greater noise than the advertised static noise value. Nonetheless the above test indicates that the noise after the amplifier and through the slip ring is negligible.

In an earlier gimbal stabilization system involving a two axis gyroscope, a miniature pointing unit, MPU, incorporated a type 1 track loop. The dry tuned motor gyroscope, DTRG, gyro used on the MPU and other similar gimbal designs was the Condor Pacific GTB-2. It was discovered that such a two-axis gyroscope would not support high-gain type 2 track loops as required to meet various accuracy requirements. Simply put, the cross coupling inherent in the dry tuned motor gyroscope nutation dynamics would not allow the nutation mode to be satisfactorily stabilized.

It has been determined that the line-of-sight error (root mean square of the root sum square of both axes) between the true target position and the Fine Track Sensor (FTS) track point, measured over a 0.2 sec period should better than 200 μRad in the static mode and in the dynamic mode. The dynamic condition should also include certain threat angular acceleration capabilities as will also be appreciated by those of ordinary skill in the art.

To realize this performance, type 2 track loop gains on the order of 8,000 sec$^{-2}$ were found to be required. As mentioned above, laboratory experiments indicated the onset of nutation mode instability at gains exceeding about 400 sec$^{-2}$ with the original 2-axis gyro. Subsequent analyses and simulation studies corroborated this result, and indicated that control loop redesign could only yield stable operation with gains below about 1000 sec$^{-2}$. The agreement of analysis and empirical data provided a high degree of confidence in the problem assessment.

The solution embodied in the present invention is to de-couple the track loops by replacement of the 2-axis gyro with two single-axis angular rate sensors. The major physical difference is the implementation of two rate sensors verses the one gyro. A preferred rate sensor is the Systron Donner (BEI) Gyrochip QRS11 with a range of ±50°/second.

The GyroChip QRS11 is a MEMS, solid-state "gyro on a chip" angular rate sensor. The device utilizes a one-piece micro-machined, vibrating quartz tuning fork sensing element. The Coriolis effect produces deflection of the vibrating fork that is sensed to produce a DC voltage output proportional to the rate of rotation. Because the "gyro on chip" employs no bearing supported rotating parts, it provides a significantly higher Mean Time Between Failure, MTBF, than that of conventional gyros. Standard Mil_H-DBK-217 calculations predict better than 400,000 hours MTBF, depending on the environmental condition selected. These Systron Donner devices have accumulated over 1,500,000 hours of operation in commercial aircraft applications and over 2,000,000 hours of continuous operation without a single failure for the US Navy shipboard antenna stabilization application.

The preferred mounting configuration for the present invention is depicted in FIG. 3 with rate sensor 20 on the elevation pivot arm 36 rotating with the elevation mirrors 38 and 40. Rate sensor 18 is mounted below input mirror 38. This configuration eliminates the mass of the mirror coupling arm and distributes the mass of the two rate sensors.

In one embodiment, each rate sensor is provided with its own supply voltage regulator (not shown) to eliminate cross coupling effects that can occur with a common power source. Buffer amplifiers in amplifier and slip ring assemblies 72 and 81 are used at or near a single axis rate sensor to minimize the effects of noise that can be induced on low level analog signals by slip rings and long lead lengths.

It will be appreciated that the additional benefits of the present invention includes the fact that using the solid-state rate sensors simplifies the system by eliminating excitation voltages required for the spin motor and pick-off sensors and the pick-off demodulation circuitry required by the dry tuned motor gyroscope. Not only does the system become more simple, but also the solid-state rate sensors are more robust, with an order-of-magnitude better mean time before failure, MTBF. There is also much less impact to EMI/EMC.

Another additional benefit is that the elimination of the dry tuned motor gyroscope eliminates tonal noise on the motion sensing signals that occur at the nutation frequency, the motor spin frequency and multiples thereof, and at a frequency dependent on the spin bearing retainer design.

Finally, the use of two sensors allows them to be physically separated to achieve a more advantageous mass distribution of the elevation gimbal assembly.

It will be appreciated that the drive for the two axis gimbal described herein is available commercially off-the-shelf from a variety of different vendors.

Figure 7:
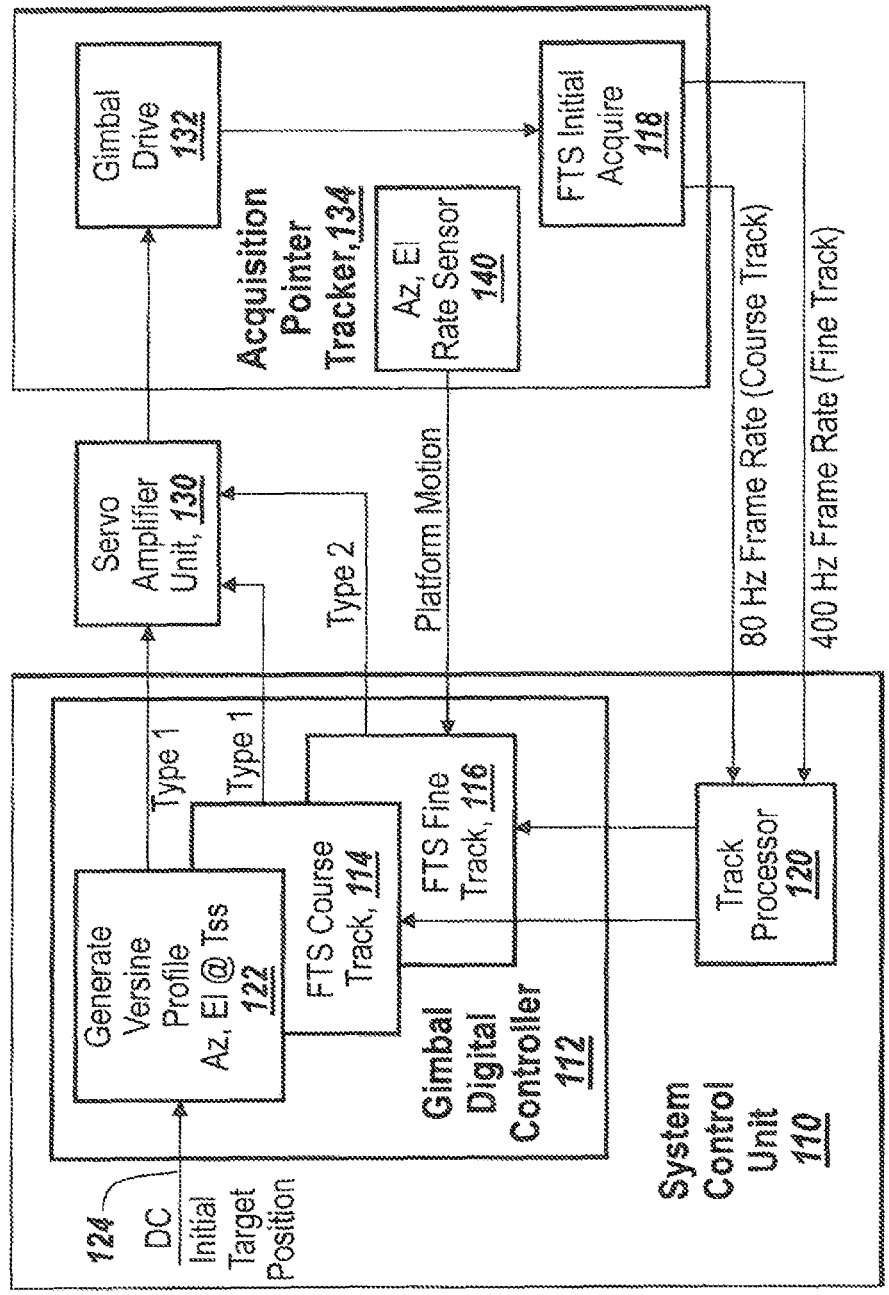
FIG. 7 is a track loop block diagram of the subject system.

More particularly and referring now to FIG. 7, taking into account the failure of the type 1 track loops to meet the stringent pointing accuracy required in certain gimbals, the FIG. 7 system provides a high-gain, type 2 track loop. What is shown in FIG. 7 is a track loop diagram in which a system control unit 110 for gimbal 10 is provided with a gimbal digital controller 112 that contains a coarse track 114 module and a fine track module 116 coupled to a fine track sensor camera 118 that is used in the initial target acquisition and corresponds to narrow angle gimbal camera 49 of which focal plane array 48 of FIG. 2 is a part.

After initial target acquisition, the output of fine track sensor camera 118 is applied to a track processor 120 in system control unit 110 that tracks the image once it has been initially acquired. The target track in both coarse form and fine form is applied to a profile generator 122 which generates a versine profile of the azimuth and elevation of the acquired target that is required to gimbal laser 50 to a target.

Profile generator 122 is provided with an initial target position from a missile warning system as illustrated by arrow 124 in the form of a DC initial target position signal. The outputs of the profile generator 122, coarse track module 114, and fine track module 116 are digital signals that are applied to a servo amplifier unit 120 which converts the digital signals into analog voltages suitable to drive the gimbal elevation and azimuth motors that are coupled to a gimbal drive 132 in an acquisition pointer-tracker 134 that houses the fine track sensor mentioned above.

All of the above is operable to take an initial target position and generate analog signals of sufficient magnitude to drive the gimbal motors. In a two axis gimbal, this means driving the elevation axis motor and the azimuth axis motor.

It is noted that initially one has a very coarse estimate of target position from the missile warning system. The missile warning system in free space will acquire an image that is determined to be a target and provide data back to system control unit 110 of gimbal 10 to indicate in world coordinates that there is an oncoming missile at a particular spot or location in the world map.

Gimbal digital controller 112 uses Euler's equation to transform the world map coordinates to platform coordinates so one can know where to drive the gimbal to in order to project the laser beam on target.

The fine track sensor camera 118 and its focal plane array 48 are used to fine tune the direction of laser beam 44 by detecting where on focal plane array 48 the target image exists. This information is used to initially aim laser 50 at this position. Once fine track sensor 118 picks up the image track, processor 120 starts to track that image gimbal 10 is used to drive that image toward the center of focal plane array 118 to aim laser 50 at the target. As described in a patent application entitled Non-Adjustable Pointer-Tracker Gimbal Used For Directed Infrared Countermeasures Systems invented by Armando Corella, Lynne Buzdar and Ronald Gidseg, U.S. application Ser. No. 12/499,584, now abandoned, filed Jul. 8, 2009, assigned to the assignee hereof and incorporated herein by reference, an aim-point map further corrects the output mirror 40 of gimbal 10 to establish parallelism between the line-of-sight 42 to the target and outgoing laser beam 44.

Camera 49 used as fine track sensor 118 has a frame rate which establishes when the camera is blind. The camera is blind for a very short period of time, and it is during this time period that the rate sensor data is utilized to stabilize the gimbal. The aforementioned azimuth and elevation rate sensors are shown here by reference character 140 and it is these rate sensors that establish platform motion during this blind period.

The relatively low voltage from rate sensors 140 is applied to fine track sensor module 116 and is converted by servo amplifier unit 130 to amplified analog signals useful in driving the gimbal motors.

The azimuth and elevation rate sensors have orthogonal sensitive axes and measure the angular velocity of the aircraft as it pitches, rolls and yaws. Note velocity is convertible to an angular displacement using differentiation. The angular motion is measured by the output voltage from the sensor and it is the purpose of the subject invention to provide an analog drive signal that results in the counteracting of the sensed angular motion to reverse the sensed aircraft movement.

Processor 78 of FIG. 2 establishes by an appropriate equation the signal required for a gimbal motor to drive the gimbal by that exact amount to reverse the sensed angular motion by repositioning output mirror 40 of gimbal 10 by that angle which cancels the angular motion that is sensed by the rate sensors. Thus in one embodiment processor 78 is coupled to microprocessor 80 to generate the exact voltage or current which is used to power the gimbal drive motors to reverse the effect of the sensed angular motion.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A method for stabilizing a two axis gimbal mounted on a platform and used in directed infrared countermeasure systems employing input and output mirrors fixedly attached to an elevation arm that rotates about an elevation axis, the elevation arm mounted to an azimuth platter mounted for rotation about an azimuth axis, comprising the steps of:
   locating single axis rate sensors having orthogonal sensitive axes adjacent the mirrors, the sensitive axes of said single axis rate sensors aligned respectively with the elevation axis and the azimuth axis;
   processing the output of the rate sensors to establish angular movement of the elevation arm and azimuth platter due to platform movement, and;
   using the sensed angular movement to drive the elevation arm and azimuth platter in a direction to counter the sensed angular movement, thereby to cancel the effect of the angular movement on the gimbal.

2. The method of claim 1, wherein the elevation arm and azimuth platter are provided with drive motors, and wherein each of the rate sensors includes tuning fork sensing elements that output an analog voltage indicative of the sensed angular movement, and wherein the processing step includes converting the sensed analog voltage to a digital equivalent and processing the digital equivalent to produce analog signals to be applied to the elevation and azimuth drive motors to reposition the output mirror of the gimbal to compensate for the sensed angular movement.

3. The method of claim 2, wherein the gimbal includes a camera that is read out at a predetermined frame rate that establishes camera on and off times, and wherein the processing step includes reading out the rate sensors during the time that the camera is off.

4. The method of claim 3, wherein the frame rate is 400 hertz and wherein the off time of the camera is 0.2 seconds.

5. The method of claim 3, wherein the camera off time is a fraction of the camera on time.

6. The method of claim 5, wherein the voltage output of the rate sensors is sampled during the off time of the camera at a predetermined point in time and wherein the voltage from the rate sensors at the predetermined point in time specifies the angular movement of the platform at the predetermined point in time.

7. The method of claim 2, wherein the output signals from the processing step includes drive signals for the drive motors of the elevation arm and azimuth platter that initially drives the gimbal to establish a laser beam directed to a target, and wherein the processed signals from the rate sensors are combined with the signals used to drive the elevation arm and azimuth platter motors.

8. The method of claim 1, wherein the elevation arm is rotatable about the elevation axis, and wherein a first rate sensor is mounted at the elevation arm with the sensitive axis thereof aligned with the elevation axis.

9. The method of claim 1, wherein the azimuth platter is rotatable about the azimuth axis, and wherein a second rate sensor is mounted such that the sensitive axis thereof is aligned with the azimuth axis.

10. The method of claim 9, wherein the second rate sensor is mounted on the elevation arm.

11. The method of claim 10, wherein the second rate sensor is mounted to the input mirror.

12. The method of claim 1, wherein the elevation arm carries the input and output mirrors at opposite ends thereof, and wherein the respective rate sensors are mounted at opposite ends of the elevation arm for optimal mass distribution purposes.

13. Apparatus for the stabilization of a two axis gimbal having a laser and a camera against movement of the gimbal platform, comprising:
an elevation arm having input and output mirrors fixedly mounted thereto, said elevation arm mounted for rotation about an elevation axis;
an azimuth platter mounted for rotation about an azimuth axis and carrying said elevation arm and internal mirrors for redirecting radiation from said input mirror to the camera carried by said gimbal and for redirecting a laser beam from the laser carried by said gimbal to said output mirror;
a pair of rate sensors having orthogonal sensitive axes mounted at said elevation arm and said azimuth platter, respective sensitive axes being aligned with said elevation axis and said azimuth axis; and,
a processing unit coupled to said rate sensors for processing signals indicative of angular movement of said platform at a predetermined point of time and for generating azimuth platter and elevation arm drive signals for positioning said output mirror such that said sensed angular movement is compensated by the repositioning of said output mirror.

14. The apparatus of claim 13, wherein the rate sensor associated with the elevation axis is mounted to said elevation arm such that the sense axis of the rate sensor associated with the elevation arm is aligned with said elevation axis.

15. The apparatus of claim 13, wherein the rate sensor having a sensitive axis aligned with said azimuth axis is mounted to said azimuth platter.

16. The apparatus of claim 15, wherein the rate sensor having an axis aligned with the azimuth axis is mounted to said input mirror.

17. The apparatus of claim 13, and further including a slip ring assembly for transmitting the outputs of said rate sensors to said processing unit.

18. The apparatus of claim 13, wherein said rate sensors are single axis rate sensors.

19. The apparatus of claim 13, wherein said camera has a predetermined frame rate establishing on and off times for said camera, and wherein the outputs of said sensors are processed by said processing unit only during the time period that said camera is off.

20. The apparatus of claim 19, wherein the outputs of said sensors are processed at a particular point in time to establish sensed angular movement at said particular point in time.

* * * * *